(No Model.)
J. W. MACY.
PIANO.
No. 495,678. Patented Apr. 18, 1893.
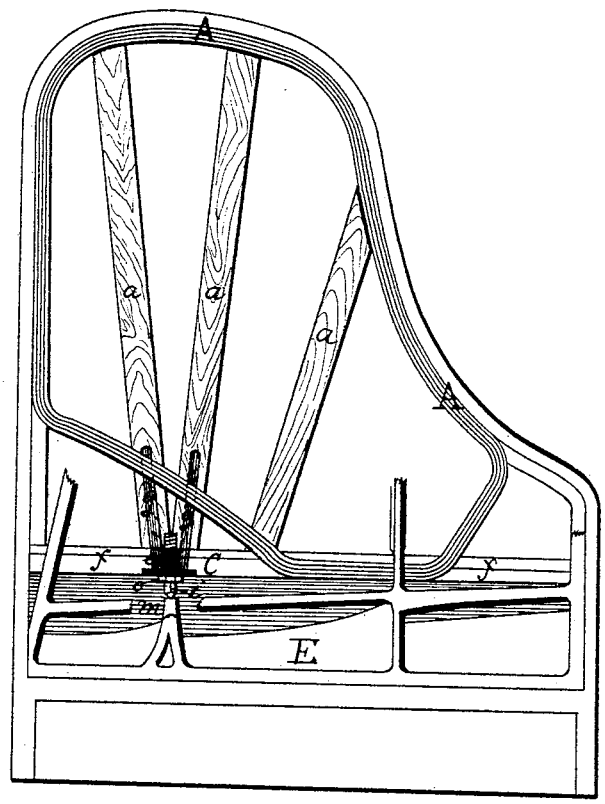
WITNESSES:
Chas Joslin
Horace K. Blinn
INVENTOR.
John W. Macy.

UNITED STATES PATENT OFFICE.

JOHN W. MACY, OF CINCINNATI, OHIO.

PIANO.

SPECIFICATION forming part of Letters Patent No. 495,678, dated April 18, 1893.

Application filed July 28, 1892. Serial No. 441,445. (No model.)

*To all whom it may concern:*

Be it known that I, JOHN W. MACY, a citizen of the United States, residing at Cincinnati, in the county of Hamilton and State of Ohio, have invented new and useful Improvements in Pianofortes, of which the following is a specification.

My invention has reference to certain improvements in grand pianos. It is the function of the metal frame of the pianoforte to sustain the tension of the strings. By my improved construction the wooden frame is utilized in increasing the strength and sustaining power of the metal frame.

My strengthening device consists of a metal collar, bolt and lock nut so mounted upon the cross blocking that they bring the ends of two of the stiffening braces into service in increasing the strength of the metal frame.

In the accompanying drawing the manner of connecting the wooden frame directly with the metal frame is illustrated. The metal frame is shown in part only, allowing a view of the construction below.

Similar letters of reference indicate corresponding parts.

The wooden frame of a grand piano consists of the bent wood rim A, and interior stiffening braces $a$. These braces in my system of construction extend from a central point in the blocking to the rims in lines conforming to the fanlike spread of the strings. The strength of the braces is thus centralized and it is at this central point that I place my device C, for supporting the metal frame E. This device consists of a metal nut and collar $e$, let into the blocking $f$, and bearing upon the ends of heavy wooden dowels $g$, that extend through the blocking $f$, well into the braces $a$. The bolt $i$ extending through the nut and collar $e$, engages with a lug $m$, cast on the under side of the metal frame E. The wooden frame is thus brought in direct contact with the metal frame, the connection being regulated and maintained by the bolt $i$, which is locked in place by the nut $o$. By thus reinforcing the metal frame the strength and rigidity of the entire construction are greatly increased, and the power and resonance of the tone enhanced.

Having described my invention, I claim as new and desire to secure by Letters Patent—

1. In a grand piano a metal frame support C, consisting of a nut and collar $e$, bolt $i$ lock nut $o$, mounted upon the blocking $f$, and bearing upon the ends of the dowels $g$, said dowels extending through the blocking into the braces $a$, substantially as described and set forth.

2. In a grand piano the combination of the metal frame support C, consisting of a nut and collar $e$, bolt $i$, lock nut $o$, and dowels $g$, extending through the blocking $f$, into the braces $a$, with the wooden frame and the metal frame E, through the medium of the lug $m$, substantially as described.

3. In a grand piano the metal frame support C, arranged in the manner set forth for regulating and maintaining the connection between the wooden frame and the metal frame E substantially as described and set forth.

JOHN W. MACY.

Witnesses:
CHAS. JOSLIN,
HORACE K. BLINN.